March 14, 1967  A. H. FREEMAN ET AL  3,308,535

ELECTRIC SLICING KNIFE

Filed Sept. 1, 1964

Inventors:
Arthur H. Freeman,
Hugh M. Forman.
by Laurence R. Kempton
Attorney

United States Patent Office 3,308,535
Patented Mar. 14, 1967

3,308,535
ELECTRIC SLICING KNIFE
Arthur H. Freeman, Brockport, N.Y., and Hugh M. Forman, Wawatosa, Wis., assignors to General Electric Company, a corporation of New York
Filed Sept. 1, 1964, Ser. No. 393,586
9 Claims. (Cl. 30—272)

This invention relates to electric slicing knives and in particular to a manually operated switch mechanism for such a knife.

Among the reasons for the increased acceptance of portable electric household appliances by the housewife, has been the willingness of appliance manufacturers to provide convenient safety features on their appliances. Of course, the manufacturer is faced with the problem of incorporating adequate safety measures in the appliance without unduly hampering its convenient manipulation by the user or excessively increasing the total cost of the product beyond a price acceptable to the consumer.

Electrically motorized small appliances commonly include one or more rapidly moving working elements which could provide some safety hazard.

Operation of such appliances is usually initiated by a manually operated switch and it is therefore important to insure against inadvertent actuation of the appliance motor by someone handling it. Design features which have been utilized heretofore in electric knives to minimize such accidental operation are set forth in copending patent application Serial No. 298,302, J. W. Beisheim, filed July 29, 1963, now Patent No. 3,203,096, assigned to the assignee of this application.

The introduction of the electric slicing knife described in the above application as a mass produced consumer appliance has been unusually well received by the consumer public. As in the case of many small motorized appliances, a demand for battery operated knives, comparable to the earlier alternating current devices, has arisen. With the increased versatility of such a knife which is no longer reliant on a convenience outlet for power positive means for preventing accidental knife motor operation is necessary for maximum safety.

Accordingly, it is one object of this invention to provide an electrically operated slicing knife having positive means to prevent accidental energizataion of the knife motor.

It is yet another object of this invention to provide such a means at a minimum additional cost which does not hamper convenient operation and manipulation of the knife by the user.

In carrying out the objects of our invention in one form thereof, an electric knife is provided having a handle which supports a motor and drive mechanism, which reciprocate a pair of cutting blades. A pair of contacts, one of which is movable by a finger-operated switch actuator supported by the handle, are mounted on the handle to control the flow of current to the motor. To provide a positive means for locking the switch actuator so as to prevent the closing of the contacts, in any fashion, a control button is engageable with the switch actuator, being movable between a "safety" position to an inactive "use" position. When in the "safety" position, the button is in engagement with the switch actuator and means on the knife handle so as to limit any motion of the switch actuator.

In accordance with another aspect of our invention resilient means are mounted within the switch actuator and engageable with the control button to insure snapping movement of the button from the safety position to the inactive position. The resilient means also holds the button in either of these positions.

Additionally, the control button is positioned with respect to the switch actuator and both of these are positioned in relation to the handle configuration so as to insure convenient single-handed operation of both the actuator and the control button by the user.

Other objects and advantages of our invention may best be understood by reference to the following description taken in connection with the accompanying drawings in which.

Figure 1:
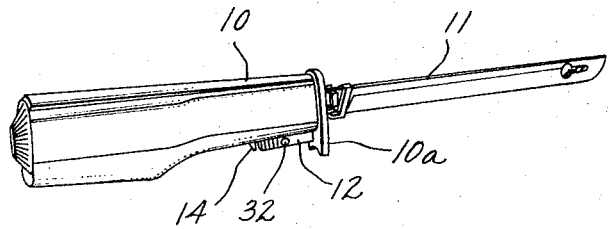
FIG. 1 is a perspective view of the entire electric slicing knife incorporating the features of our invention.
Figure 2:
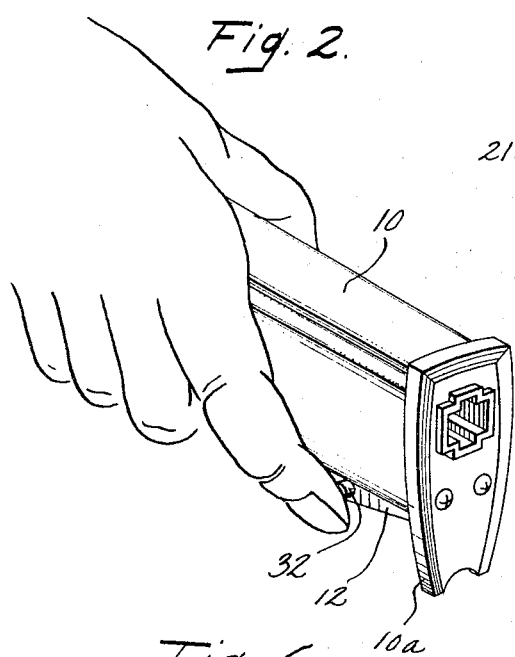
FIG. 2 is a perspective view showing the forward portion of the knife handle and the convenient manual operation of the switch mechanism.

The electric slicing knife of this invention, as shown in FIG. 1, includes a hollow, elongated housing or handle 10 and a pair of cutting blades 11 which extend from the forward end or hilt 10a of the handle. A motor and drive unit (not shown) are enclosed within handle 10 and are adapted for manually releasable connection to the knife blades.

As may be seen in FIGS. 1–4, a switch actuator or trigger 12 is positioned in an elongated recess 13 formed in the forward bottom wall of housing 10. Parallel side walls of the handle having edges 13a and 13b define the width of recess 13. Hilt 10a is designed to extend downwardly beyond the lowermost portion of trigger 12 when the knife is held in a normal horizontal position, being closely adjacent the forward end of the trigger in order to minimize the likelihood of accidental actuation of the trigger. Likewise, a guard element 14 is integrally formed in the lower portion of housing 10 and extends downwardly at least as far as the lowermost portion of trigger 12 for the same reason.

Figure 3:
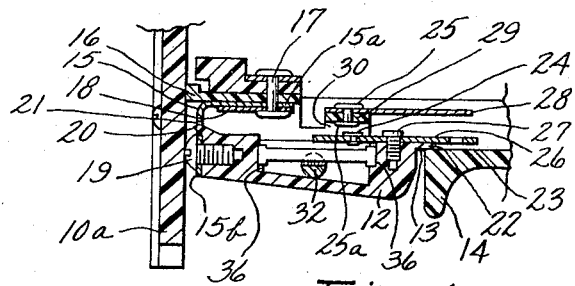
FIG. 3 is a side sectional view of the lower forward portion of the knife handle shown in FIGS. 1 and 2.
Figure 4:
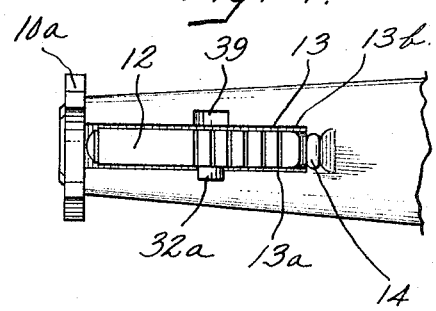
FIG. 4 is a bottom view of the forward portion of the knife handle as seen in FIG. 3 with the switch control button in the safety position.

Turning now to the mounting of trigger 12 to handle 10, it can be seen in FIG. 3 that the trigger is spring biased in a clockwise direction by an L-shaped mounting spring 15. The upper or horizontal leg 15a of the spring is secured to the lower surface of a platform 16 which is integrally formed within the handle. This connection is made by a rivet or other suitable fastener 17. The lower or vertical leg 15b of the L-shaped spring is positioned within the forward portion of recess 13, being covered by hilt 10a.

It has been found that some tendency exists for spring 15 and therefore trigger 12 to pivot laterally about rivet 17. To limit this pivoting a rigid insert 18, preferably of stiff metal, is sandwiched between leg 15a of the spring and platform 16. Insert 18 is held in position by rivet 17 which passes through an aperture adjacent its rearward end.

A threaded fastener, such as screw 19, secures the forward end of trigger 12 to leg 15b. To properly position the trigger with respect to the spring and handle an integral pin or projection 20 is provided on the forward end of the trigger to mate with an aperture 21 in the spring. A rearward tang 22 of the trigger is integrally formed and positioned so as to overlie the upper surface 23 of the lower handle wall. This relationship holds the trigger within the handle against the strong bias of spring 15 which tends to rotate the trigger clockwise about its leg 15a.

In order to control the energization of the electric circuit through the knife motor, a pair of contacts 24 and 25 are mounted within the handle. Contact 24 may comprise a silver rivet secured adjacent the forward end of a longitudinally extending terminal arm 26. Arm 26 is, in turn, secured to trigger 12 by a suitable fastener 27. Contact 25 also takes the form of a rivet having a lower contacting surface 25a. It can be seen that the counterclockwise rotation of trigger 12 against the bias of spring 15 rotates the forward portion of terminal arm 26 so that contact 24 meets contact 25 to complete the motor circuit.

Contact 25 also secures a second longitudinally extending terminal arm 28 to the top surface of an integral plate 29 formed within the handle. Plate 29 is spaced above recess 13 of the lower handle wall by a pair of vertical integral legs, such as seen at 30 so that plate 29 straddles the recess. Terminal arms 26 and 28 each include terminals for their connection into the motor circuit.

Figure 6:
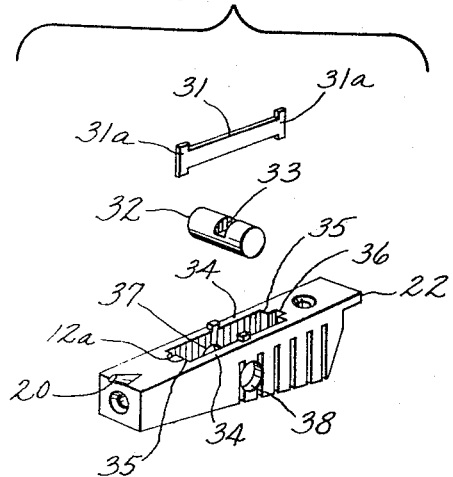
FIG. 6 is an exploded perspective view of the elements shown in FIG. 5.
Figure 5:
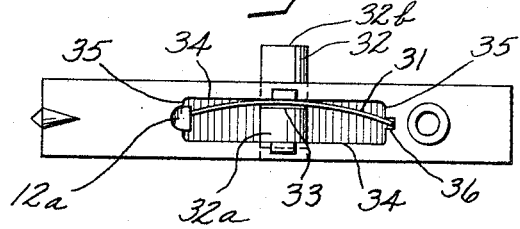
FIG. 5 is a top view of the switch actuator and safety control mechanism removed from the knife handle.

In accordance with our invention, a switch safety lock carried by trigger 12 is provided, as perhaps may be best seen in FIGS. 5 and 6. The switch-locking mechanism comprises a plastic leaf spring 31 and a generally cylindrical locking or control button 32 having a central slot 33. These members are engaged within a trigger cavity formed by a pair of opposing side trigger walls 34 and a pair of opposing end walls 35.

Spring 31 includes enlarged portions 31a at each end for accommodation in a pair of vertical slots 36 formed in the forward and rearward end walls 35 of the trigger cavity. Spring 31 is pre-loaded, i.e., it is constantly in a state of bias or flexure. This pre-loading results from the dimensioning of the spring so that from front to rear is greater than the distance from front to rear of the slots in which its ends 31a are accommodated. Thus, to fit within the cavity, spring 31 must be flexed against one or the other of the side walls 34. A trigger tab 12a overlies the forward spring portion 31a.

Button 32 is slidably mounted in trigger 12 and is supported within a pair of axially aligned apertures 37 and 38 formed in trigger side walls 34. It may be seen in FIG. 5 that the length of button 32 is greater than the width of the trigger so that at all times a portion of the button is exposed on one side of the trigger. Button 32 is positioned approximately in the center of the trigger cavity with spring 31 having its central portion residing in slot 33 of the button.

The lower handle side walls, having edges 13a and 13b which define the lower edge of recess 13, cooperate with button 32 in the following manner to prevent or permit normal manual actuation of trigger 12. When button 32 is in the position shown in FIGS. 2 and 4, the top surface of one end portion 32a of the button is in close proximity to the bottom edge of wall edge 13a, thereby limiting the upward (counterclockwise as viewed in FIG. 3) motion of the trigger. This locks the trigger in a "safety" position, preventing accidental actuation of the trigger for the closing of contacts 24 and 25.

When it is desired to place the knife in operation, control button 32 may be pushed laterally, transversely to the knife handle axis, to the "use" position shown in FIG. 5. In this position, the opposite button end portion 32b extends from the opposite side of the trigger. As may be seen in FIG. 4, a depression or recess 39 is formed in the wall edge 13b. Thus, the upward motion of the trigger is permitted with the extending button portion 32b being accommodated in recess 39.

It is an important feature of our invention that button 32 is conveniently positioned with respect to both trigger 12 and the knife handle so that the locking or unlocking of the trigger may be accomplished with a single hand of the user without releasing the knife handle. As demonstrated in FIG. 2, the tip of the forefinger may conveniently push the button from the locked to the unlocked position. To reverse the motion of button 32 the convenient grippable forward portion of the handle permits encircling of the lower surface of the trigger by the forefinger so that the tip of the forefinger may return the button to the locked position.

As a further feature of our invention, it should be noted that switch trigger 12, control button 32, and movable contact 24 of the motor controlling switch are mounted together as a single movable element. This construction not only minimizes the amount of parts and cost of manufacture, but also permits accurate dependable control of the switch contacts.

The pre-loaded leaf spring of our invention accomplishes a dual purpose in that (1) it retains control button 32 in the switch trigger without the necessity of any additional parts and (2) insures a snapping motion of the button between a locked and an unlocked position.

Lastly, our invention insures simple low cost assembly. In assembling the trigger and safety mechanism, it is merely necessary to insert button 32 through apertures 37 and 38 and to insert spring 31 downwardly through the open top of the trigger cavity with its end portions 31a in slots 36 and its central portion in slot 33 of the button. The bias of spring 31 is sufficient to maintain the spring and button 32 within the trigger.

We have thus disclosed an electric slicing knife having a unique, conveniently, operated safety button which permits positive prevention of the accidental actuation of the knife switch trigger. Our safety lock arrangement may be conveniently operated by the hand which is supporting the knife handle without losing control of the knife and does not unduly increase the cost of manufacture beyond a price acceptable to the consumer. It is to be understood that the particular construction described herein is by way of example only and it is the aim of the appended claims to cover all such equivalent variations as come within the true spirit and scope of the foregoing disclosure.

What we claim is:

1. In a portable electric slicing knife having a hollow handle, an electric motor supported by said handle and adapted for connection to a source of power, and cutting means extending forwardly from said handle and connected to said motor, means for controlling the flow of electric current to said motor comprising:
    (a) a movable switch actuator pivotally mounted on the handle and engageable by a finger of the hand grasping the handle, said actuator having a normally opened position and a closed position;
    (b) a pair of contacts, one of said contacts being movable by said actuator into electrical contact with the other of said contacts;
    (c) means for normally maintaining said contacts in spaced relation to one another;
    (d) a manually operated button spaced from said pivotal mounting and positioned in an aperture formed in said actuator;
    (e) means secured to said actuator and connected to said button for holding said button in first and second positions, said button being manually movable between said first and second positions;
    (f) means on said handle for permitting movement of said actuator from said opened position to said closed position when said button is in said first position; and means on said handle for preventing such movement when said button is in said second position.

2. In a portable electric slicing knife having a hollow handle including an outside surface and an inside surface, said handle having a longitudinal axis, an electric motor supported by said handle and adapted for connection to a source of power, and cutting means extending forwardly from said handle and connected to said motor, means for controlling the flow of electric current to said motor comprising:
    (a) a movable switch actuator secured to said handle and engageable by a finger of the hand grasping of the handle, said actuator having a normally opened position and a closed position;

(b) a pair of contacts, one of said contacts being movable by said actuator into electrical contact with the other of said contacts;

(c) a button mounted on said actuator and manually movable along an axis generally transverse to said handle axis between a first and a second position;

(d) means mounted on said actuator, engageable with said button, for holding said button in said first and second positions;

(e) means on said handle for permitting movement of said actuator from said opened position to said closed position when said button is in said first position and means on the outside surface of said handle for preventing such movement when said button is in said second position.

3. In a portable electric slicing knife having a hollow handle including an inside surface and an outside surface, an electric motor supported by said handle and adapted for connection to a source of power, and cutting means extending forwardly from said handle and connected to said motor, means for controlling the flow of electric current to said motor comprising:

(a) a movable switch actuator secured to said handle and engageable by a finger of the hand grasping the handle, said actuator having a normally opened position and a closed position;

(b) a pair of contacts, one of said contacts being movable by said actuator into electric contact with the other of said contacts;

(c) means defining an aperture through said switch actuator;

(d) a manually operated button mounted on said actuator and extending through said aperture for reciprocal motion therein between a first and second position;

(e) means on the outside surface of said handle for engagement with said button when said button is in one of said positions to prevent movement of said actuator from said normal position to said closed position.

4. The slicing knife recited in claim 3 wherein said actuator is generally hollow and includes resilient means mounted within said actuator for maintaining said button in said first and second positions.

5. In a portable electric slicing knife having a hollow handle including an outside surface and an inside surface, an electric motor supported by said handle and adapted for connection to a source of power, and cutting means extending forwardly from said handle and connected to said motor, means for controlling the flow of electric current to said motor comprising:

(a) a movable switch actuator secured to said handle and engageable by a finger of the hand grasping the handle, said actuator having a normally opened position and a closed position;

(b) means including generally opposite wall edges defining an aperture in said handle;

(c) at least a portion of said switch actuator being positioned between said wall edges;

(d) a pair of contacts, one of said contacts being movable by said actuator into electrical contact with the other of said contacts;

(e) a pair of side walls on said actuator;

(f) a manually operated member extending through said actuator and between a first position and a second position;

(g) said button extending outwardly beyond one side wall of said switch actuator a sufficient distance when in said first position so that movement of said switch actuator from said opened position to said closed position is prevented by the engagement of said button with the outside surface of said handle.

6. In a portable electric slicing knife having a hollow handle including an outside surface and an inside surface, an electric motor supported by said handle and adapted for connection to a source of power, and cutting means extending forwardly from said handle and connected to said motor; means for controlling the flow of electric current to said motor comprising:

(a) a movable switch actuator secured to said handle and engageable by a finger of the hand grasping of the handle, said actuator having a normally opened position and a closed position;

(b) a pair of contacts, one of said contacts being mounted on said actuator for movement thereby into electrical contact with the other of said contacts;

(c) means for selectively preventing movement of said actuator from said opened position to said closed position comprising:

(aa) a manually movable button mounted on said actuator and extending at least partially through said actuator, (bb) means within said actuator engageable with said button for holding said button in one of two given positions, and (cc) means on the outside surface of said handle engageable with a portion of said button when said button is in one of said given positions to prevent movement of said actuator from said opened position to said closed position.

7. The slicing knife recited in claim 6 wherein said actuator engageable means includes a resilient elongated strip having an axis transverse to the axis of the button and said strip is mounted by its longitudinal edges within said actuator to permit snapping resilient movement of said button between said first and second positions.

8. A portable electric slicing knife comprising:

(a) a hollow handle housing having an outside surface and an inside surface a longitudinal axis;

(b) an electric motor within said housing adapted for connection to a source of power;

(c) a knife blade extending forwardly from said housing and connected to said motor;

(d) means for controlling the flow of electric current to said motor including:

(aa) a movable switch actuator secured to said handle;

(bb) a pair of contacts, one of said contacts being movable by said actuator into electrical contact with the other of said contacts;

(cc) means for normally maintaining said contacts in spaced relation to one another;

(e) means for preventing movement of said actuator from a normal position to an actuated position comprising:

(aa) a movable button extending through said actuator and being movable along an axis transverse to said housing axis;

(bb) means within said actuator engageable with said button for holding said button in first and second positions;

(f) means on the outside surface of said handle engageable with a portion of said button when said button is in said first position to prevent movement of said button from said normal positon to an actuated position.

9. A portable electric slicing knife comprising:

(a) a hollow handle having an inside surface and an outside surface;

(b) an electric motor positioned in said handle and adapted for connection to a source of power;

(c) cutting means extending forwardly from said handle and connected to said motor;

(d) means including generally opposite walls arranged generally perpendicular to the outside surface of said hollow handle defining an elongated aperture in said handle;

(e) a movable switch actuator positioned within said elongated aperture and engageable by a finger of the hand grasping the handle, said actuator having a normally opened position and a closed position, said actuator including a first pair of opposed side walls arranged generally parallel to the side walls forming the elongated aperture in said handle, said actuator also including a second pair of opposed side walls arranged generally perpendicular to said first pair of opposed side walls;

(f) a circular aperture extending through said first pair of opposed side walls;

(g) a generally cylindrical button positioned within said actuator and extending through said circular aperture;

(h) opposed slots formed in said second pair of opposed side walls;

(i) a generally diametrical slot formed in said cylindrical button;

(j) a resilient elongated strip having two ends and a central portion, the ends of said strip being positioned in the slots formed in said opposed side walls and the central portion of said strip being positioned in the slot formed in said generally cylindrical button, said resilient strip permitting snapping resilient movement of said button between a first and second position;

(k) a recess formed in one of the side walls defining said elongated aperture, said button being arranged for free unobstructed movement within said recess; and (l) said button extending outwardly beyond the other side wall defining said elongated aperture a sufficient distance when in the first position so that movement of said switch actuator from said second opened position to said closed position is prevented by the engagement of said button with the outside surface of said handle.

References Cited by the Examiner
UNITED STATES PATENTS

| | | | |
|---|---|---|---|
| 1,493,559 | 5/1924 | Norden. | |
| 3,132,227 | 5/1964 | Butler | 200—157 |
| 3,194,084 | 7/1965 | Filander | 200—157 |
| 3,203,096 | 8/1965 | Beisheim et al. | 30—272 |

WILLIAM FELDMAN, *Primary Examiner.*

JAMES L. JONES, Jr., *Examiner.*